(12) United States Patent
Sera

(10) Patent No.: US 6,879,589 B2
(45) Date of Patent: Apr. 12, 2005

(54) DATA PACKET TRANSFER NETWORK AND DATA PACKET TRANSFER METHOD

(75) Inventor: Takafumi Sera, Tokyo (JP)

(73) Assignee: NEC Corporation, Tokyo (JP)

( * ) Notice: Subject to any disclaimer, the term of this patent is extended or adjusted under 35 U.S.C. 154(b) by 860 days.

(21) Appl. No.: 09/737,316

(22) Filed: Dec. 14, 2000

(65) Prior Publication Data

US 2001/0005371 A1 Jun. 28, 2001

(30) Foreign Application Priority Data

Dec. 22, 1999 (JP) .......................................... 11-365455

(51) Int. Cl.$^7$ .............................................. H04L 12/28
(52) U.S. Cl. ........................ 370/394; 370/392; 709/232
(58) Field of Search ................................. 370/394, 392, 370/230, 473, 474, 428; 711/100; 709/238, 232

(56) References Cited

U.S. PATENT DOCUMENTS 5,737,311 A * 4/1998 Wyld .......................... 370/227
6,430,617 B1 * 8/2002 Britt et al. ................... 709/224

FOREIGN PATENT DOCUMENTS

| JP | 61-273048 | 12/1986 | | |
|---|---|---|---|---|
| JP | 62-076946 | 4/1987 | | |
| JP | 01-026216 | 5/1989 | | |
| JP | 01-119149 | 5/1989 | | |
| JP | H01-269339 A | 10/1989 | ........... | H04L/11/20 |
| JP | 02-109445 | 4/1990 | | |
| JP | 06-014056 | 1/1994 | | |
| JP | 07-046250 | 2/1995 | | |
| JP | 07-162430 | 6/1995 | | |
| JP | 08-186597 | 7/1996 | | |

* cited by examiner

Primary Examiner—Duc Ho
(74) Attorney, Agent, or Firm—Michael Best & Friedrich LLP

(57) ABSTRACT

In a data packet transfer network in which a communication data is transmitted by dividing the communication data to a plurality of data packets, each of a plurality of packet transfer nodes included in the data packet transfer network comprises at least a data packet comparison circuit for comparing sequential numbers of received data packets with sequential numbers of data packets received in the past and a data packet copy circuit for copying the data packets in the order of the sequential numbers thereof and transferring the data packets to a next packet transfer node in the order of the sequential numbers. Data loss is reduced even when there is a time delay until the data is received by a destination node, so that the data is transmitted reliably.

6 Claims, 7 Drawing Sheets

DATA PACKET TRANSFER NETWORK AND DATA PACKET TRANSFER METHOD

CROSS REFERENCE TO RELATED APPLICATIONS

The present invention claims priority from Japanese Patent Application No. 11-365455 filed Dec. 22, 1999, the contents of which are incorporated herein by reference.

BACKGROUND OF THE INVENTION

1. Field of the Invention

The present invention relates to a packet transfer network using data selection switching based on a receiving comparison and a data packet transfer method.

2. Description of Related Art

In an internet, which is a typical example of the conventional data packet transfer system on a packet transfer network, a data packet received from a transmitting terminal is transmitted to one of possibly optimal transmission paths, which is selected on the basis of a destination address described in a header attached to the packet by a packet transfer node or a router. Packet transfer nodes in succeeding stages perform similar processing to transmit the data packet to a node or a host having a final destination address.

In the packet transfer node in which the data packet is processed, one packet received is merely transmitted to one path. Therefore, a data packet is neither copied nor forcibly abandoned as a whole packet transfer network and the data packet is basically transmitted from a transmitting node thereof to a receiving node uniformly.

That is, if a packet transfer node transfers a data packet correctly and reliably and there is no fault such as data loss in a transmission path thereof, the data packet can safely reach a destination node. However, if a packet is not transferred due to congestion of processing in or fault of a hardware of the packet transfer node or data loss in the transmission path, a destination node performs a recovery operation to receive the lost data packet by detecting the fault and requesting the transmitting side of a re-transmission of the data packet.

As shown in "Packet re-sending control system" disclosed in JP H01-269339A, each of nodes between a transmitting node and a receiving node performs a receiving confirmation for each data packet with adjacent nodes by using a system in which a packet re-transmission control is performed between adjacent transmitting node and receiving node.

However, there are problems in the above mentioned prior art technique, which will be described below.

A first one of the problems is that, although the cause of the phenomenon of the loss of data packet occurs in a relaying node or a transmission path, the loss of data packet can be detected in only a node in which data packet is assembled. That is, since it is usual that the assembling of data packet is performed in a last node, that is, the destination node, a loss of a data packet on the way to the destination node is determined in assembling some data packets.

A second problem is that, since the re-transmission request of data packet is made to a transmitting node, there is a time delay from a time at which data packet is lost until to a time at which a re-transmitted data packet is correctly received by a destination node. In order to detect a lost data packet without delay, it may be considered that a data packet is reconstructed in every packet transfer node. In such case, however, the merit of data packet transfer may be lost. Even in the technique disclosed in JP H01-269339A, there are problems that a delay occurs due to sacrifice of the merit of capability of transfer processing of every packet without consideration of inter-packet path, which is a feature of the packet transfer, by performing a receipt confirmation for every packet between adjacent nodes and that additional buffer resources are required.

The third problem is that, when a destination node is shifted in a packet transfer network, a delay occurs from a completion of a notice of a new location to which the destination is shifted until a data packet can be received by the new location. The reason for this is that, since, when the notice of the new location to which the destination node is to be shifted is made for the packet transfer nodes and the transmitting node, the data packet is not transferred to the new location unless a transfer path is changed, a delay occurs between a time at which the notice of the transfer path to the new location is received by a repeating nodes and the transmitting node and a time at which an information of the new transfer path to the new location is updated.

SUMMARY OF THE INVENTION

An object of the present invention is to make a data packet capable of being reliably transmitted to a destination host even when there is a time delay until the data packet is received by the destination node, by preventing data from being lost.

Another object of the present invention is to provide a construction of a data packet transfer network, in which a communication data is divided to a plurality of data packets and the data packets are transmitted, which is capable of preventing data packets from being lost within the packet transfer network, by copying and transferring a packet transmitted from a transfer node.

In a data packet transfer network for transmitting a communication data by dividing it to a plurality of packets, the present invention is featured by that each transfer node in the network comprises at least a data packet comparing circuit for comparing a sequential number of a received data packet with sequential numbers of data packets received in the past and a data packet copy circuit for copying and transferring the data packets received in the past in the sequence of the sequential numbers thereof according to the sequential number of the received data packet.

In the data packet transfer network for dividing a communication data to a plurality of data packets and transmitting the data packets, the present invention is further featured by that each packet transfer node in the network comprises at least a data packet comparing circuit for comparing a sequential number of a received data packet with sequential numbers of data packets received in the past and a data packet copy circuit for copying and transferring the data packets received in the past in the sequence of the sequential numbers thereof according to the sequential number of the received data packet, wherein the packet transfer node includes transmission path determining means for determining a plurality of transmitting path numbers to transmit the data packet to the transmission path number corresponding to a shift of a destination host.

In the data packet transfer network for dividing a communication data to a plurality of data packets and transmitting the data packets, the present invention is further featured by that each packet transfer node in the network compares a sequential number of a received data packet with sequential numbers of data packets received in the past and stored in a comparison table when the received data packets are new data packets, copying the data packets received in the past in the sequence of the sequential numbers thereof according to the sequential number of the received data packet, transferring them to a plurality of transmission paths and transmitting the data packets to the transmission path corresponding to a shift of a destination host.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

First Embodiment
(1) Description of the Construction

Figure 1:
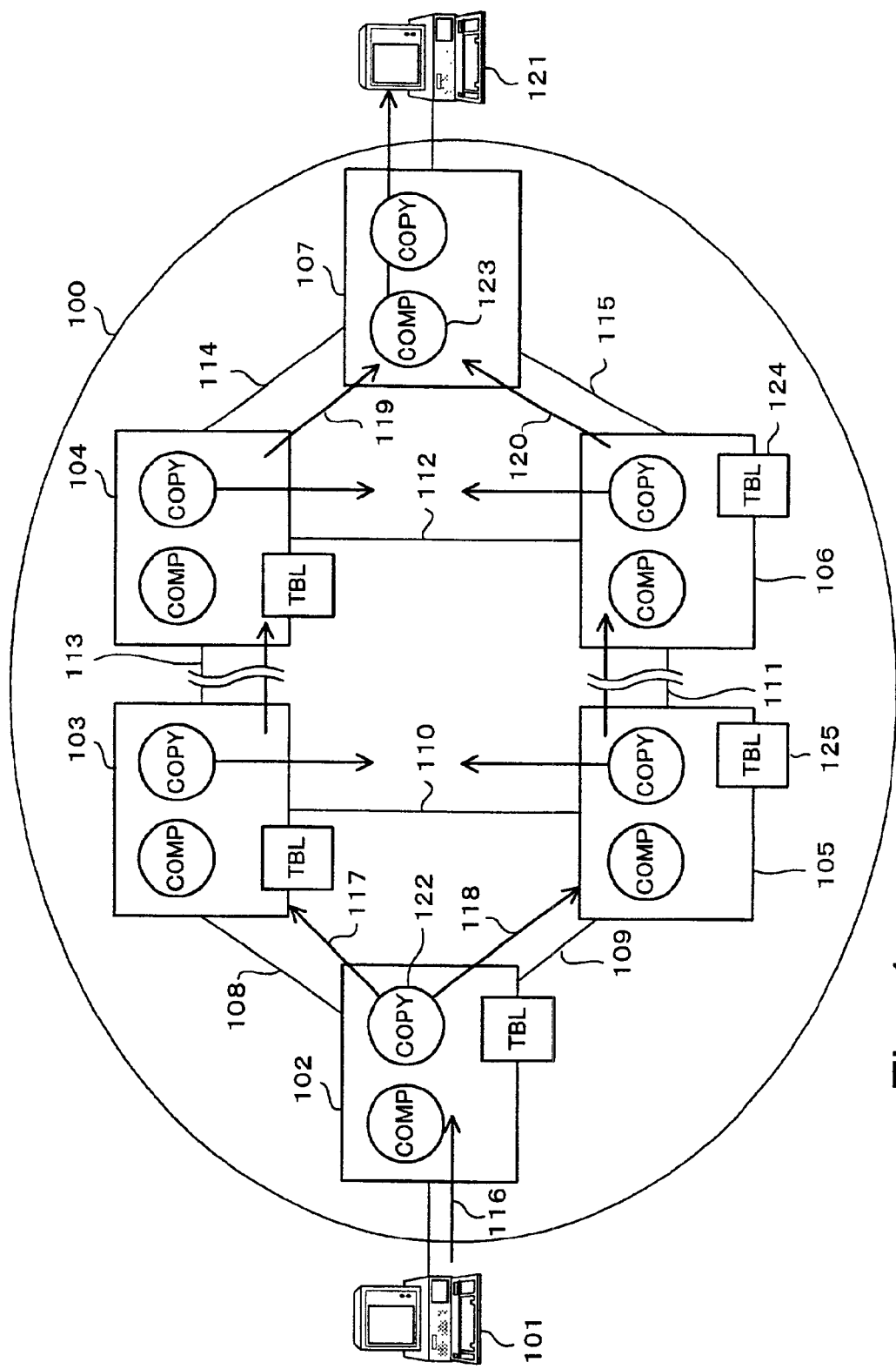
FIG. 1 shows a construction of a packet transfer system according to the present invention.

Referring to FIG. 1, a first embodiment of a packet transfer system according to the present invention, which utilizes a data selective switching by means of a received packet comparison, includes a packet transfer network 100, a source host 101 for transmitting data packets and a destination host 121 for receiving the data packets transmitted by the source host 101 through the packet transfer network 100. The packet transfer network 100 includes packet transfer nodes 102, 103, 104, 105, 106 and 107 each for transferring a received data packets to a next packet transfer node. Each of the packet transfer nodes 102 to 107 includes a data packet comparison circuit 123 for comparing the received data packets to determine one of the received data packets, which is a newest, a comparison table 124 (125) for storing sequential numbers of transfer packets and a data packet copy circuit 122 for copying data packets to be transmitted. The packet transfer nodes are connected to adjacent packet transfer nodes through transmission paths 108, 109, 110, 111, 112, 113, 114 and 115, respectively.

The source host 101 transmits a data packet to the packet transfer node 102. The packet transfer node 102 receives the data packet from the source host 101 and transmits it to the transmission paths 108 and 109, which are transfer paths toward the destination host 121 to which the data packet is to be transferred finally. Similarly, the packet transfer node 103 transmits the data packet transmitted by the packet transfer node 102 to the transmission paths 110 and 113 and the packet transfer nodes 104, 105, 106 and 107 transmit the data packet to the transmission paths sequentially in the similar manner. The data packet comparison circuit 123 of each packet transfer node compares a content of the received data packet with contents of data packets stored in the comparison table thereof. The data packet copy circuit 122 copies the received data packet in order to transmit it to a plurality of transmission paths. The transmission paths 108, 109, 110, 111, 112, 113, 114 and 115 operate as means for transferring data packets from the source host 101 through the packet transfer nodes 102, 103, 104, 105, 106 and 107 to the destination host 121. The comparison table 125 of each packet transfer node is constituted with a memory storing data packets and sequential numbers thereof as pairs. Since each packet transfer node processes packets of a plurality of source hosts and a plurality of destination hosts, the paired data packets and their sequential numbers, which are stored in the comparison table, are stored every source host+destination host. Therefore, the comparison table is generally constructed with a plurality of entries. Consequently, as a data format therefor, the entries of the table are combinations of respective source hosts and respective destination hosts.

In this construction of the comparison table, when the packet transfer node 102 transmits a data packet 116 received from the source host 101 to the packet transfer nodes 103 and 105 adjacent thereto, the data packet copy circuit 122 thereof copies the data packet and the packet transfer node 102 transmits the copied data packet to the transmission paths 108 and 109. In the packet transfer node 107, which receives data packets 119 and 120 copied by and transferred from the packet transfer nodes 104 and 106, the data packets 119 and 120 to be transferred to the destination host 121 are compared by the data packet comparison circuit 123 thereof with using the comparison table thereof, which stores the sequential numbers of data packets to be transferred, to select only optimal one of the data packets by the sequential number comparison of them. The packet transfer node 107 transmits the selected data packet to the destination host 121. In this manner, it is possible to prevent generation of data packet loss or delay failure due to delay of packet transfer caused by failure or congestion of transfer path in the packet transfer network as much as possible.

(2) Description of the Operation

Now, an operation of the whole system of the first embodiment will be described in detail with reference to FIGS. 1 to 5. It is assumed that the data packet transmitted to the data packet transfer network 100 is composed of a data packet portion and a packet header information added to the data packet portion for the packet transfer, as shown by a data format in FIG. 2. This format is usually used in the Internet or the packet exchange network and FIG. 2 shows a typical example thereof.

Figure 2:
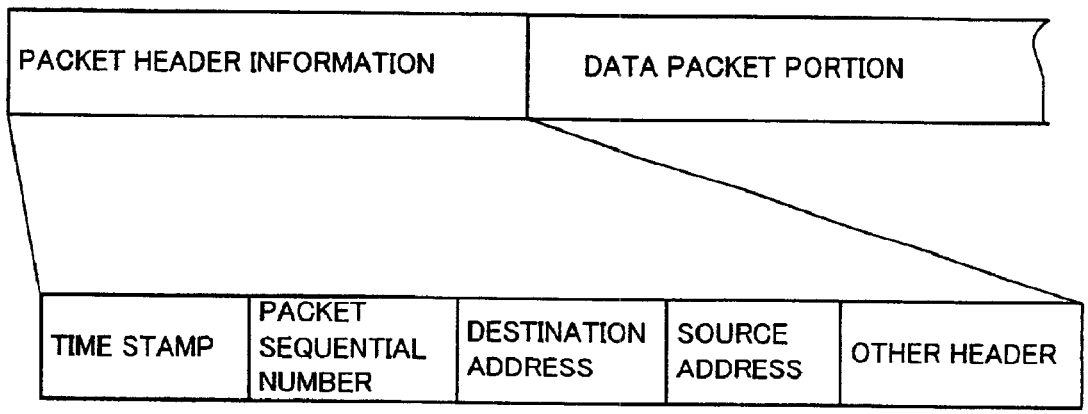
FIG. 2 shows a data packet format of the packet transfer system according to the present invention.

In FIG. 2, the packet header information of the data packet includes a time stamp such as packet transmission time instance, etc., which is necessary to assemble the packet, a packet sequential number, a destination address and a transmitting node address, etc.

For example, by referencing the packet sequential number, it becomes possible to re-assemble a data before the latter is divided to packets. In general, when data packets having serial sequential numbers are not obtained in re-assembling the packets as a preparation for a case where the packet or packets are lost, the receiving node requests the transmitting node of a re-transmission of the lost data packets and performs a processing for re-assembling a complete data with using the re-received packets.

In FIG. 1, the packet transfer node 102 transmits the data packet received from the source host 101 to the transmission paths 108 and 109, which are transfer paths toward the destination host 121.

Similarly, the packet transfer node 103 transmits the received data packet to the transmission paths 110 and 113.

The packet transfer node 104, which receives the data packet through the transmission path 113 transmits the data packet to the transmission paths 112 and 114. The packet transfer node 107 receives the data packets 119 and 120 through the transmission paths 114 and 115. The packet transfer node 107 references the packet header information such as the packet sequential number contained in the data packet of one of the data packets 119 and 120, which is received earlier than the other, and stores packet information already received. When the packet transfer node 107 detects a dual reception of a data packet older than the stored data packet, it performs a destruction processing of the data of the older data packet.

When the packet transfer node 107 receives a new data packet, the operation thereof is shifted to a processing for transmitting it to a next node and, when it receives a data packet, which is next to an already received data packet, it performs an update processing an information of the already received data packet.

Figure 3:
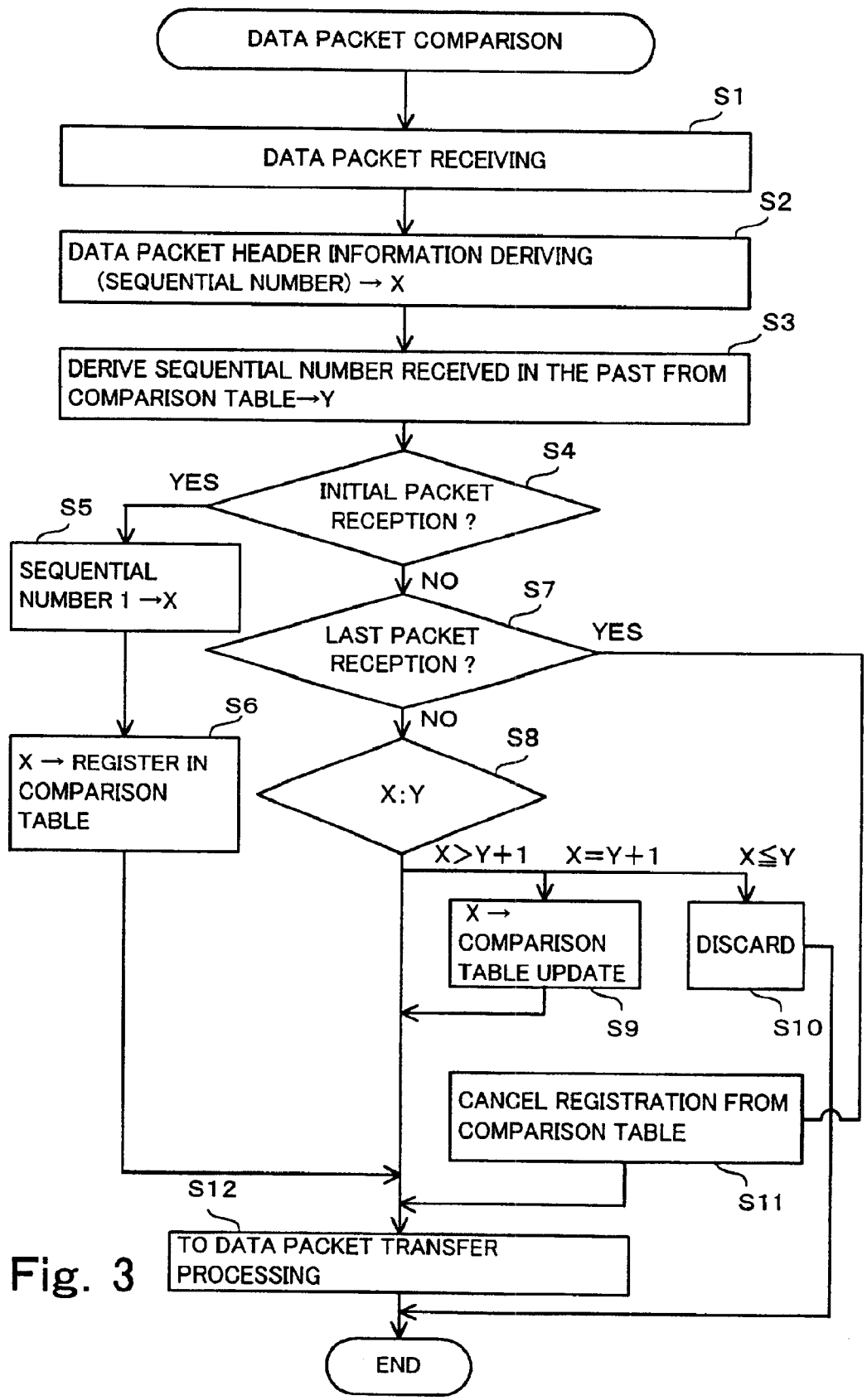
FIG. 3 is a flowchart used in the packet transfer system of the present invention.

The data packet comparison circuit 123 of a packet transfer node, which receives a data packet, operates according to a flowchart shown in FIG. 3.

When the data transfer node receives a data packet (S1), it derives a data packet header information from the received data packet (S2).

Then, the packet transfer node derives the already received sequential number X from the comparison table thereof (S3) and determines from the sequential number X whether or not there is a packet already received and, if there is no packet already received, determines whether or not the packet reception is a first reception (S4).

The sequential number of an initially received packet is 1. In a case of the first packet reception, the sequential number X is set to 1 (S5) and newly registers it in the comparison table (S6). Then, the operation is shifted to a data packet transfer mode (S8).

If the received packet is a last packet of the data (S7), the packet transfer node erases the data of the sequential number stored in the comparison table and cancels the registration thereof (S11) and the operation is shifted to the data packet transfer mode (S12).

When a sequential number Y of an already received packet is stored in the comparison table, the packet transfer node performs an arithmetic comparison of the sequential number Y with the sequential number X of the just received packet (S8).

If a result of the comparison of the sequential number is X=Y+1, the just received packet is next to the already received packet. Therefore, the sequential number in the comparison table is updated to X (S9). The received data packet is then transferred (S12).

If the result of the comparison of the sequential number is X>Y+1, the just received packet is after a packet next to the already received packet. Therefore, the received data packet is then transferred as it is (S12)

If the result of the comparison of the sequential number is X>=Y, the just received packet is a packet received prior to the already received packet. Therefore, the just received packet is discarded without transferring (S10).

In this manner, it is determined, by reading the sequential number of the header portion of the data packet, whether the just received data packet is a first data packet, whether the sequential number of the just received data packet is the same sequential number as, older or newer than that of the previously stored data packet and whether the just received data packet is a last data packet. According to the determination, the just received packet is processed.

Figure 4:
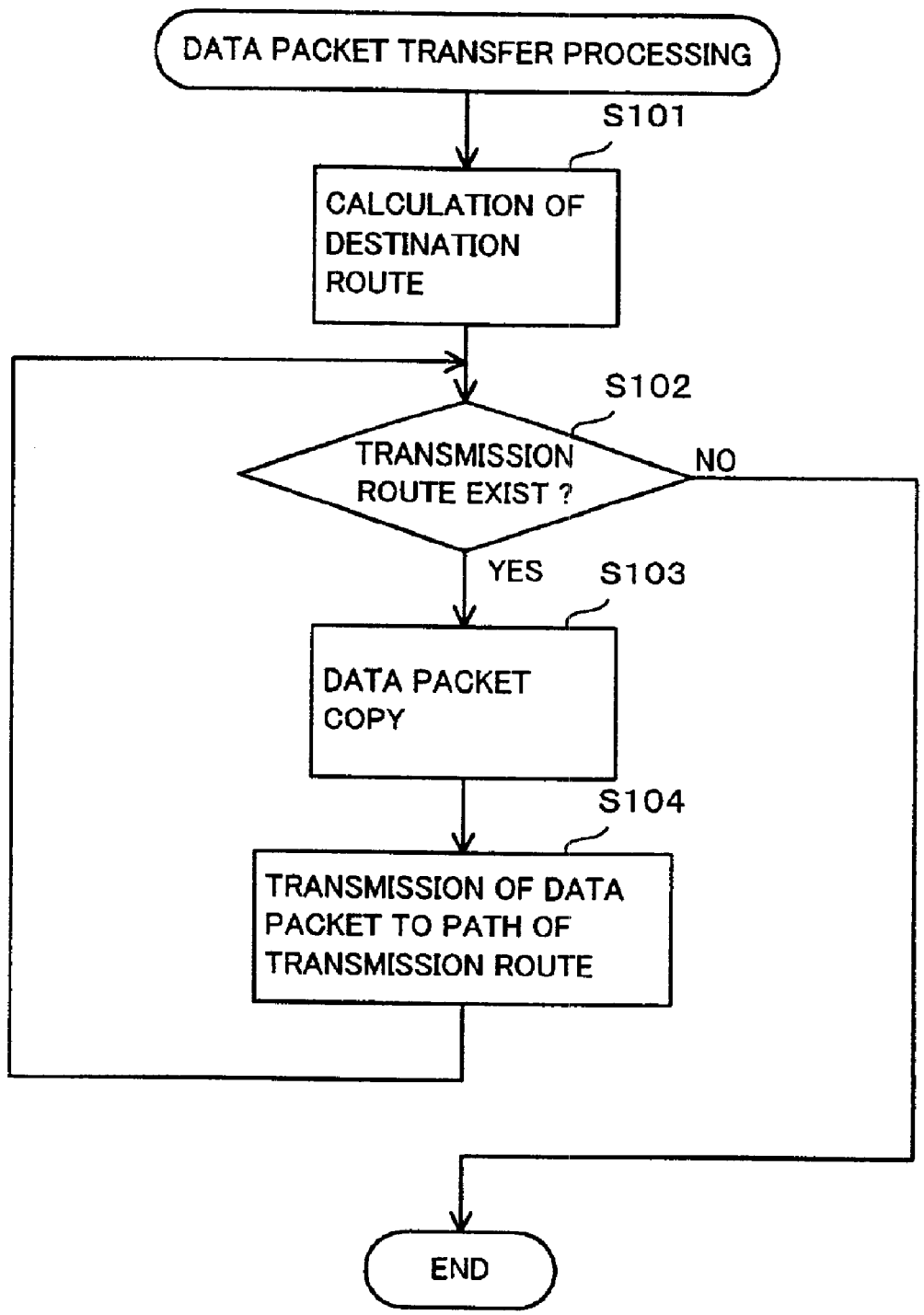
FIG. 4 is a flowchart used in a portion of the packet transfer system of the present invention.

In a flowchart of a data packet transfer processing shown in FIG. 4, a transmission path to a destination is calculated from the destination information of the data packet to be transferred (S101). If there is a transmission path (S102), the data packet is copied for transmission through the transmission path (S103). The copy of the data packet is transmitted to the transmission path (S104).

Further, when another transmission path to the destination exists, the existence is determined in the step S102 and the copy is similarly transmitted through the another transmission path through the steps S103 and 104. This is repeated until the copy is transmitted through all of the existing transmission paths.

When the copy is transmitted through all of the existing transmission paths and there is no remaining transmission path, the data packet transfer operation is ended.

Figure 5:
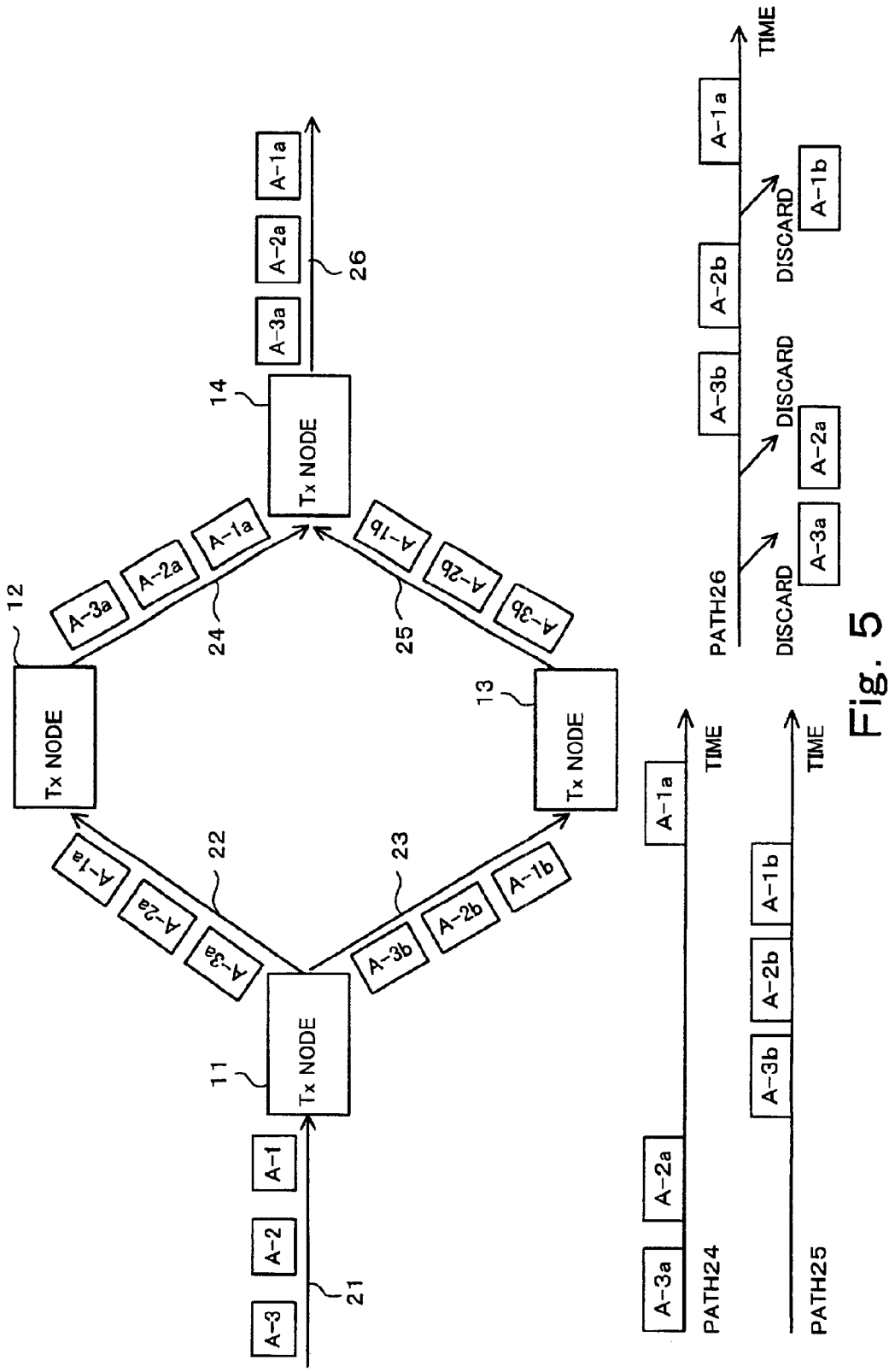
FIG. 5 shows an example of practical data packet transfer according to the packet transfer system of the present invention.

Now, this operation will be described in detail with reference to a practical case where there are two transmission paths to the destination as shown in FIG. 5.

In FIG. 5, a packet transfer node 11 receives data packets A-1, A-2 and A-3 transferred through a transmission path 21 in a time sequence.

In the packet transfer node 11, the packets having a destination in a downstream of a packet transfer node 14 are transferred to packet transfer nodes 12 and 13 adjacent to the packet transfer node 11 through transmission paths 22 and 23 as packets A-1$a$, A-2$a$ and A-3$a$ and A-1$b$, A-2$b$ and A-3$b$, respectively, according to the flowcharts shown in FIGS. 3 and 4. In this case, "3" of "A-3$a$", for example, is the sequential number.

The packets A-1$a$ to A-3$a$ and A-1$b$ to A-3$b$ arrive at the packet transfer node 14 through transfer paths 24 and 25 with slight time delay due to transfer delay, as shown in FIG. 5.

The packet A-1$a$ arriving at the packet transfer node 14 firstly is processed as a first data packet according to the flowchart shown in FIG. 3 and registered in the comparison table of the packet transfer node 14. The packet A-1$b$ arrives at the packet transfer node 14 next. Since the sequential number of the data packet A-1$b$ is the same as that of the packet A-1$a$, which is received already, the data packet A-1$b$ is discarded. Since the sequential number of the next packet A-2$b$ is the next to the sequential number of the packet A-1$a$, the packet A-2$b$ is transferred after the comparison table is updated.

The packet A-3$b$ is transferred similarly. However, since the packets A-2$a$ and A-3$a$ have the same sequential numbers as those of the packets A-2$b$ and A-3$b$, which are received already, respectively, the packets A-2$a$ and A-3$a$ are discarded.

When any failure occurs in the transmission path 22 and/or 24, the destination node can re-assemble the original data from the data packets transferred through the transmission paths 23 and 25.

As described, when there are two or more transmission paths of data packets, a destination node can receive a complete series of data packets by receiving packets in the sequential number sequence while discarding packets having the same sequential numbers as those of already received packets.

Though, in the described embodiment, the operation of the packet transfer node 107 to which the destination node 121 is connected has been described mainly, the other packet transfer nodes 103 to 106 include the data packet comparison circuits and the data packet copy circuits, respectively, and operate similarly to the packet transfer node 107. That is, each of the packet transfer nodes 103 to 106 discards a received data packet if it already has an older packet having the same sequential number as that of the received packet and transfers packets to a next packet transfer node in the sequential number sequence. Therefore, identical data packets are transferred through the respective transmission paths over again. However, since the destination node 121 can receive one of the identical data packets, which has a minimum delay, reliably and stably, the receiving quality of the whole system becomes high.

Second Embodiment

Figure 6:
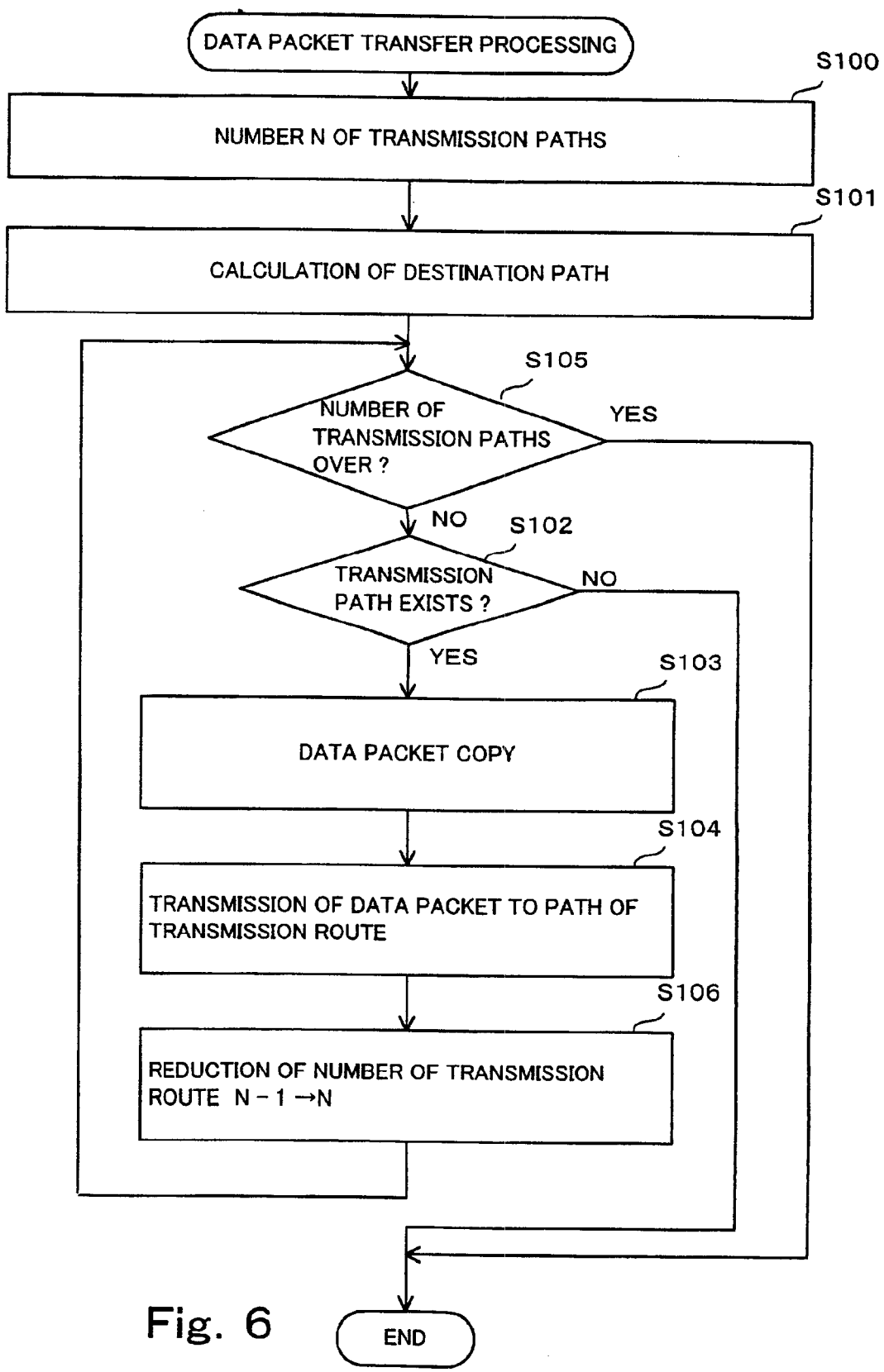
FIG. 6 is a flowchart of the packet transfer system of the present invention.

A second embodiment of the present invention will be described in detail with reference to FIGS. 6 and 7. FIG. 6 shows a flowchart of a data packet transfer processing, which improves the flowchart shown in FIG. 4 such that an explosion of packet transferred within the packet transfer network is prevented, by limiting the number of copied packets transmitted from a packet transfer node.

In FIG. 6, the flowchart includes a setting step (S100) of setting the number N of transmission paths, a determination step (S105) of determining whether or not the number of the transmission paths is over and a step (S106) of reducing the number of the transmission paths, additionally to the flowchart shown in FIG. 4. When it is determined in the determination step S105 that the number N of transmission paths in the packet transfer network is too large for a single destination host, the delay time is increased in transmitting packets. Therefore, by limiting the number of transmission paths to thereby restrict an absolute value of the amount of data transmission of the packet transfer network, the data quality is kept in a constant value or more. Then, each packet transfer node calculates the number of paths to the destination (S101), terminates a data transfer when a result of the calculation is larger than the number N of the transmission paths (S105), determines whether or not there are transmission paths to the destination host when the result of the calculation is smaller than the number N (S102), copies received data packets according to their sequential numbers when there are transmission paths (S103) and transmits the copied data packets through the transmission paths to the destination host (S104). Then, the number of transmission paths is reduced by one and the operation is returned to the step S105 (S106). This is repeated until the number of transmission paths becomes 0.

Thus, when there are many transmission paths to the destination host, the number of copied packets to be transmitted within the packet transfer network is reduced by reducing the number N of transmission paths.

Since the second embodiment aims a reduction of the number of copied packets by limiting the number of transmission paths to which the copied packets are transmitted, the number N of transmission paths is set a value smaller than the maximum number M of transmission paths belonging to each packet transfer node. That is, the number N of transmission paths is a value specific to each packet transfer node, which is selected by an operator such that it satisfies 0<N<M. The values N in the respective packet transfer nodes may be different.

Figure 7:
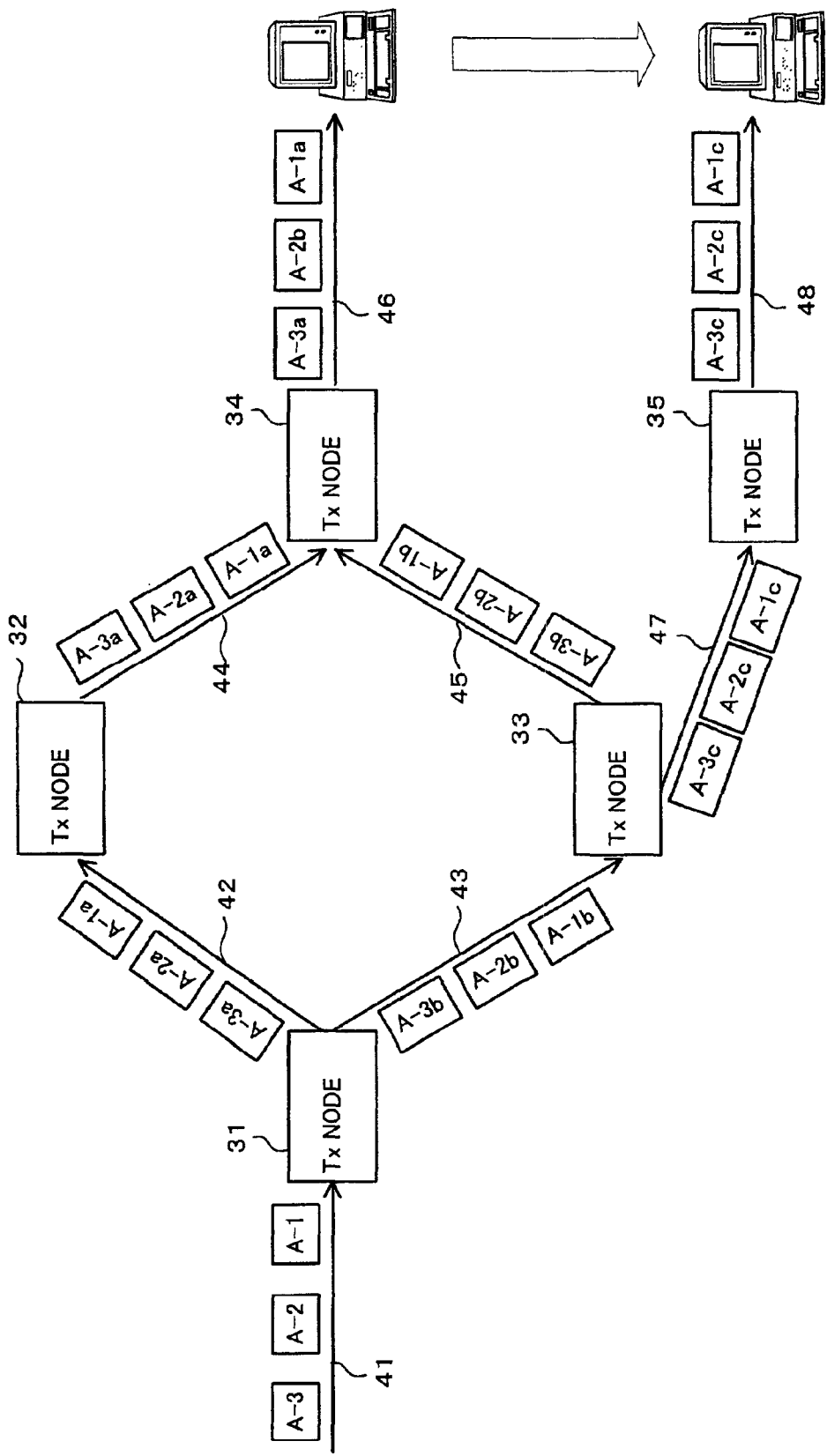
FIG. 7 shows an example of practical data packet transfer according to the packet transfer system of the present invention.

FIG. 7 shows a case where a destination host Armada, which may be a mobile station and is connected to a certain packet transfer node, is moved to another packet transfer node. A packet transfer node 34 copies received packets for a packet transfer node 35 to which the destination host may be moved and transmits the copied packets to a transmission path 41 as well.

In FIG. 7, a packet transfer node 31, which receives data packets A-1 to A-3 from a source host, transfers copied data packets A-1a, A-2a and A-3a and A-1b, A-2b and A-3b to transmission paths 42 and 43, respectively, packet transfer nodes 32 and 33 transmit copied data packets A-1a, A-2a and A-3a and A-1b, A-2b and A-3b to transmission paths 44 and 45, respectively. A packet transfer node 34 determines whether the data packets received through the transmission paths 44 and 45 are complete or partially lost on the basis of the sequential numbers thereof and transfers the data packets to the destination host. During that time, when the destination host is moved from the packet transfer node 34 to a packet transfer node 35 and can not receive all of the data packets, the destination host receives the remaining data packets from the packet transfer node 35. In this case, it is assumed that the destination host can determine whether or not the destination host received all of the data packets on the basis of the sequential numbers of the received data packets.

In this case, the destination host notifies the respective packet transfer nodes of the shift thereof and receives data packets transferred through a packet transfer path 48. Therefore, it is possible to restrict a network cut time due to switching from the packet transfer node 34 to the packet transfer node 35 as small as possible without waiting the processing delay until the path information is updated.

In a case where the source host utilizes the multi-cast system in which the number of destination hosts is assigned to a specific number, the packet transfer network operates similarly to that described above and data packets are transmitted to a plurality of destination hosts and the respective packet transfer nodes transfer the packets toward the respective destination hosts. This operation of each packet transfer node is similar in the usual broadcasting system.

According to the present invention, the copied data packets are transferred toward the destination address through a plurality of packet transmission paths. Therefore, it is possible to transfer data packets to the destination reliably even when the data packets are partially lost by failure or congestion in the packet transfer network.

Further, since the copied data packets are transferred from one packet transfer node to a next packet transfer node in the same sequence as the receiving sequence of the packets at the one packet transfer node, it is possible to transfer a plurality of data packets at higher speed than that attainable by the system in which data packets are transferred by selecting one packet transfer path.

Further, since packet loss is determined by a mere comparison of the sequential numbers of the packets, it is possible to perform the processing for improving the reliability of packet transfer easily compared with the system in which, in order to prevent packet loss, a reception of packet is confirmed every packet or some packets are stored in packet transfer nodes. This means that it is possible to realize these processes at high speed by using hardware.

What is claimed is:

1. A data packet transfer network for transmitting a communication data by dividing the communication data to a plurality of data packets, comprising a plurality of packet transfer nodes, each said packet transfer node comprising at least a data packet comparison circuit for comparing sequential numbers of received data packets with sequential numbers of data packets received in the past and a data packet copy circuit for copying the received data packets in the order of the sequential numbers thereof and transferring the received data packets to a next packet transfer node in the order of the sequential numbers.

2. A data packet transfer network as claimed in claim 1, wherein said data packet comparison circuit discards the data packets received in the past when the sequential numbers of the received data packets are the same as those of the data packet received in the past.

3. A data packet transfer network as claimed in claim 1, wherein each said packet transfer node further comprises memory means for storing the received data packets in a comparison table when the received data packets are new data packets.

4. A data packet transfer network as claimed in claim 3, wherein, when the sequential number of the received data packet is that of a last data packet, the last data packet is discarded from said comparison table and the received data packets are transferred to a next packet transfer node.

5. A data packet transfer network for transmitting a communication data by dividing the communication data to a plurality of data packets, comprising a plurality of packet transfer nodes, each said packet transfer node comprising at least a data packet comparison circuit for comparing sequential numbers of received data packets with sequential numbers of data packets received in the past and a data packet copy circuit for copying the received data packets in the order of the sequential numbers thereof and transferring the received data packets to a next packet transfer node in the order of the sequential numbers, wherein each said packet transfer node includes transmission route defining means for defining a plurality of transmission routes and transmitting the received data packets to one of said transmission routes correspondingly to a shift of a destination host.

6. A data packet transfer method for transmitting a communication data through a plurality of packet transfer nodes included in a data packet transfer network by dividing the communication data to a plurality of data packets, comprising the steps of, in each of said packet transfer node, comparing sequential numbers of received data packets with sequential numbers of data packets received in the past and stored in a comparison table when the received data packets are new data packets of said packet transfer node, copying the received data packets in the order of the sequential number, transferring the copied data packets to a plurality of transmission routes and transmitting the copied data packets to one of said transmission routes corresponding to a shift of a destination host.

\* \* \* \* \*